Feb. 13, 1951     E. A. STALKER     2,541,620
CONTROL OF AIRCRAFT PITCHING
Filed Sept. 29, 1945
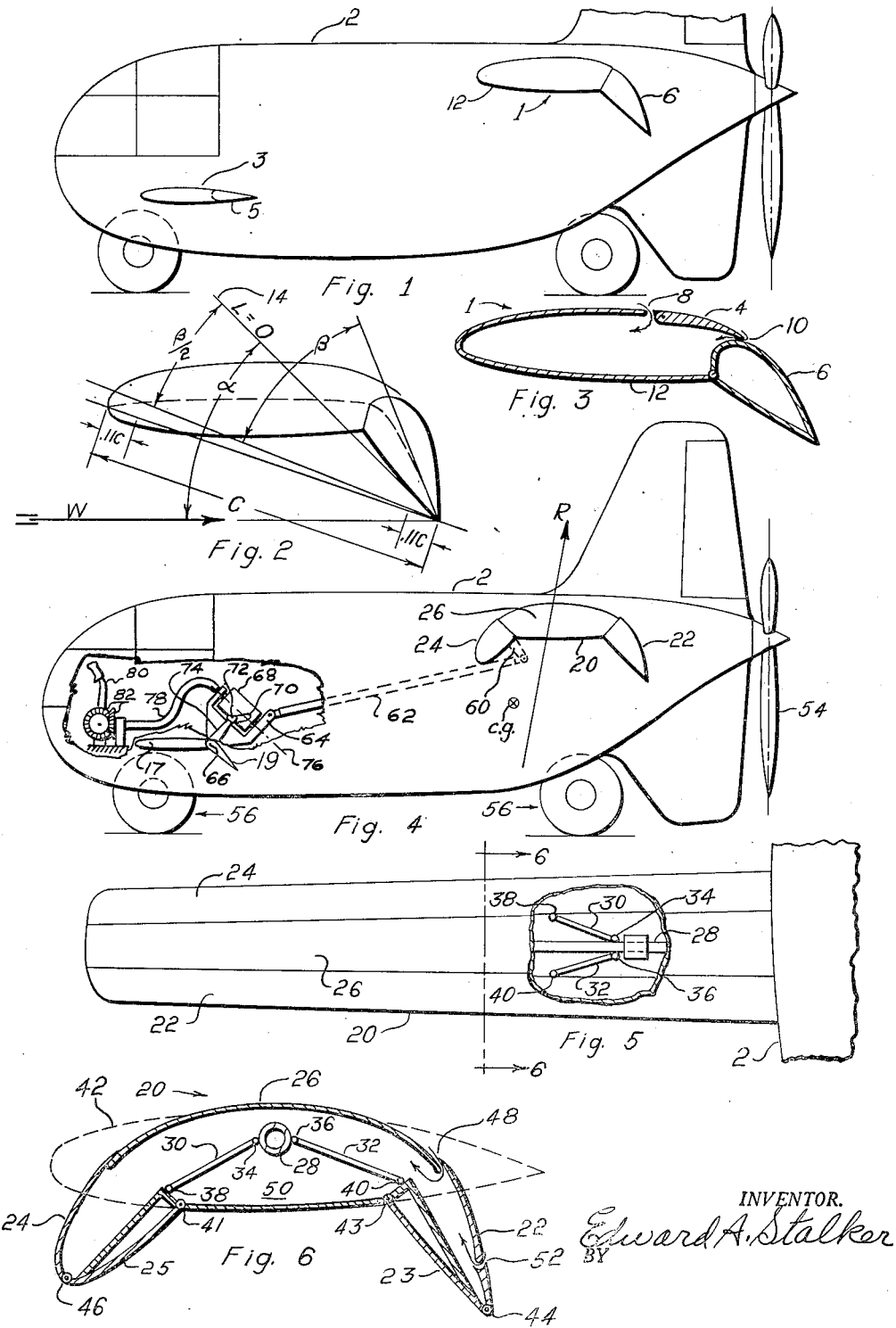
INVENTOR.
Edward A. Stalker Patented Feb. 13, 1951

2,541,620

UNITED STATES PATENT OFFICE 2,541,620

CONTROL OF AIRCRAFT PITCHING

Edward A. Stalker, Bay City, Mich.

Application September 29, 1945, Serial No. 619,349

5 Claims. (Cl. 244—42)

My invention relates to aircraft.

One of the principal objects of the invention is to provide means of preventing spinning for all attitudes of flight.

Another object is to provide means of utilizing a high lift device in aircraft. Other objects will appear from the description and drawings.

The preferred embodiment of the aircraft to accomplish the above objects is illustrated in the accompanying drawings in which—

Figure 1 is a side elevation of an airplane;

Figure 2 is an airfoil contour of the wing of Figure 1 on an enlarged scale;

Figure 3 is a vertical chordwise cross sectional view of the main wing in Fig. 1;

Figure 4 is a side elevation of the preferred airplane;

Figure 5 is a fragmentary plan of the airplane of Figure 4; and

Figure 6 is a section along the line 6—6 in Figure 5.

If a tail-first airplane is equipped with a boundary layer control device certain difficulties will arise. For instance in Fig. 1 the airplane has the wing 1 supporting the fuselage 2 in the air. Ahead of the wing is the nose plane or balancing plane 3. The approximate location of the C. G. is indicated in Fig. 4, which also shows the air force vector R. The wing has special flaps 4 and 6 (Fig. 3) and the induction slots 8 and 10 through which the boundary layer is inducted into the wing. The special flap and slot arrangement leads to very large maximum lift coefficients of the order of 5 to 6 which occur for the main body of the wing substantially parallel to the direction of flight, that is parallel to the undisturbed relative wind vector. Hence if the nose of the machine is raised or if an up gust hits the wing, the flow will burble and the wing may enter a dangerous spin. This is so because the wing is already at maximum $C_L$ for the flap fully down.

It is desirable so to arrange the nose plane that it will burble first. In the conventional nose plane airplane (canard) the nose plane will reach its maximum lift coefficient before the main wing does. This is arranged for by simply setting the nose plane 3 at an angle of attack about 4 degrees greater than the main wing. Since both wings have substantially the same range of angles from zero lift to maximum lift, the increased angle of the nose plane causes it to stall first and stop the rotation upward, thereby preventing the main wing from reaching such a large angle of attack that it will stall.

This is not practical in the airplane having a wing with the boundary layer control flap where the zero lift line 14 with the flap fully down makes an angle of attack $\alpha$ of about 60° with the relative wind vector W. See Figure 2 where the zero lift line 14 ($L=0$) is constructed by Munk's method. A conventional stabilizer can have an angular increase of about 20° before it stalls while the wing with flap down will stall at a negligible increase in angle of attack since it is already at the ultimate maximum value of $C_L$. The ultimate possible value is $2\pi$ for a sharp trailing edge.

It might be thought that this difficulty could be avoided or remedied by giving the nose plane the same type of flap as the main wing, but it must be kept in mind that the balancing plane is also the longitudinal control surface. It has flaps which can be put down to elevate the nose of the machine and with these down it still must stall before the main wing for safety. For this condition (with flaps fully down) the nose plane may be given initially an increased angle so that it does stall first. However with the nose-plane flaps 5 in neutral this front plane has recovered its range of angles so that it still has most of its 20° angular range to its stalling angle while the main wing with flaps down has still an insignificant change of angle available.

I avoid the difficulty of the angular relation of the two planes by providing the main wing with a nose flap 24 arranged to be depressed simultaneously with the lowering of the rear flap 22 as shown in Figure 4. In the lowered position of the nose flap 24 as shown in Fig. 6 it has been rotated about its pivot 41 such that it extends in major part substantially below the lower surface contour of the wing main body and in such position produces a substantial increase in the mean camber height of the wing above its subtending chord. By this device the main wing is given a large enough range of angles of attack before stalling that the nose plane 17 with flap 19 in neutral cannot attain a higher angle of attack.

On the other hand if the main wings have their flaps up and the pilot lowers the flaps 19 of the stabilizer, the latter will always stall before the main wing.

Hence it is clear for the wing with nose and tail flaps, that all conditions are met by the earlier stalling of the stabilizer, as is desired for a spin-proof airplane.

The airplane is operated at relatively high speed with the flaps 22 and 24 in the dotted position shown in Fig. 6. At the time of landing these flaps are depressed, with respect to the main body 26 of the wing, simultaneously by means of the push rod 28. Links 30 and 32 connect the push rod and the flaps 24 and 22 respectively by flexible joints 34, 36, 38 and 40. The sliding of the rod causes the flaps to be rotated about flap hinges 41 and 43.

The flaps are each made of an upper and a lower segment 24 and 25 for the nose flap and 22 and 23 for the rear flap. The segments are hinged respectively at 44 and 46. The upper segments are supported at their forward ends by lugs (not shown) of an inverted T shape which slide in grooves in the upper covering of the main body.

The front flap upper segment preferably bears on the upper surface of the main body 26 but the rear upper segment is spaced from the upper surface to form the slot 48.

As shown in Fig. 4 when nose flap 24 is lowered (by the mechanism shown in Figs. 5 and 6) arm 60 revolves and moves push-pull rod 62 which in turn revolves crank arm 64 around the axis 66 which is the hinge axis of elevator flap 19. Arm 64 supports cylindrical cam 68, which with its cam slot 70 engages roller 72 on the end of arm 74. Arm 74 is fastened to flap 19 so that when arm 64 is revolved the entire assembly of the cylindrical cam and arm 74 revolves and moves flap 19, a downward movement of nose flap 24 producing a corresponding depression of the flap 19. The cylindrical cam, however, may be rotated around its own axis 76 by flexible torque shaft 78 propelled by the pilot with control stick 80 and bevel gears 82. Revolving of cam 68 moves roller 72 and arm 74 which in turn moves flap 19. It is thereby possible for the pilot to superimpose motion of flap 19 on any position fixed by the motion of wing nose flap 24.

The permissible upward displacement of the flap 19 in response to the stick 80 movement is restricted so that the stabilizer will stall before the main wing with the nose flap down. That is, it is not possible for the pilot to set flap 19 of the balancing plane so high as to exclude stalling thereof as needed to keep the main wing from stalling. The rotation of the wing nose flap downward will always accomplish a rotation of the flap 19 downward sufficiently to assure that the balancing plane will stall earlier than the main wing. This is assured by restricting the up displacement of flap 19.

It is to be understood that this interconnection between the balancing plane and the wing flaps is also useful when the balancing plane 17—19 (tail plane) is aft of the main wings. In such an arrangement the wing 26 is given a sufficiently larger range of angles by lowering the nose flap 24 so that operation of the tail plane will not cause stalling of the main wing.

A suitable power driven blower is arranged in the aircraft to withdraw air from the interior compartment 50 of the wing so that it is at a lower pressure than the air pressure outside the wing whereby a flow is induced through the slots 48 and 52.

The airplane is to be driven by the propeller 54 and landed on the gear 56.

The following is a specific example of an airplane constructed in accordance with the present invention and having the following dimensional characteristics:

Stabilizer area, 18 sq. feet.
Chord, 1.72 feet.
Main wing area, 216 sq. feet.
Main wing chord, 6 feet.
Distance from C. G. aft to airforce vector in high speed condition (flaps up) +2.0 feet.
Distance from C. G. aft to airforce vector low speed condition (wing flaps down) +0.10 feet.
Total weight of airplane, 2470 pounds.

In the high speed condition the stabilizer will carry 290 lb. and the wings 2180 for balance. This is a load of 16.1 lb. per sq. foot for the stabilizer and 10.1 for the main wing. Since the stabilizer and wing have the same aspect ratio the stabilizer will stall first because of its greater load per square foot and its greater angle of attack to carry this greater load per square foot.

In the low speed condition with the wing flaps down the air force vector is inclined rearwardly and passes closer to the C. G. The stabilizer then carries only 16.3 lb. and the main wing 2453.7 lb. Thus the stabilizer has a very small load per square foot and must be rotated about 16° to stall while the main wing with rear flap only would stall for an increase of only a few degrees since it is at its maximum possible angle of attack for maximum lift. However with the nose flap lowered along with the trailing edge flap the angle of attack of the wing must be increased by about 25° to stall. Hence the stabilizer will stall first. Therefore the undesirable condition (that the wing with boundary layer control, as described, operating with trailing edge flap down will stall first) is overcome by the use of the nose flap and the stabilizer is made to stall first as desired for safe operation of the aircraft.

It is to be understood that the nose flap could be arranged to be operated to counteract a tendency for stalling arising from the operation of any high lift device which tends to lower the maximum pitch angle for which maximum lift coefficient is attained. The lowering of the nose flap would then guard against a positive pitch from the balancing plane as a result of an upgust or inadvertent use of the controls.

A rotation of the airplane upward at the nose is commonly called positive pitching.

I have now described suitable embodiments of my invention which are now preferred. It is to be understood however that the invention is not limited to the particular construction illustrated and described and that I intend to claim it broadly as indicated by the scope of the appended claims.

I claim:

1. In combination in an aircraft, a main wing having a nose flap and a trailing edge flap, boundary layer control means including a slot on the upper wing surface, a balancing plane positioned in longitudinally spaced relation from said wing adapted to give rise to a pitching motion in the direction to increase the angle of attack of said wing beyond that of maximum lift, interconnecting means for concurrently lowering said nose flap and said trailing edge flap relative to the wing main body to provide a substantial increase in the mean camber height of the wing above its subtending chord, additional means interconnected with said nose flap for increasing the lift of said balancing plane concurrently with the lowering of said flaps, and pilot control means for differentially adjusting the lift of said balancing plane relative to that of said wing while maintaining said nose flap in said lowered position.

2. In combination in an airplane, a wing having a trailing edge lift flap and a nose flap, said wing having a normal relatively high speed attitude relative to the flight direction with said flaps in raised position, means for displacing said trailing edge flap downward, boundary layer control means including a power operated blower within the airplane cooperating with said trailing edge flap to produce a high maximum lift coefficient for said attitude of said wing, a balancing plane positioned ahead of said wing adapted to give rise to a positive pitching moment tending to increase the angle of attack of said wing beyond that of maximum lift, means operable in coordination with the lowering of said nose flap to increase the lift of said plane, and common control means connected to both said plane and said flaps operable to lower said nose flap concurrently with the downward displacement of said trailing edge flap to produce by its lowering a substantial increase in the mean camber height of the wing above its subtending chord to assure the stalling of said balancing plane before the stalling of said wing.

3. In combination in an aircraft, a wing having an adjustable leading edge flap, a control plane longitudinally spaced from said wing, and common control means connected to both said control plane and said flap to adjust the effective angle of attack of said plane and said leading edge flap coincidentally and in predetermined coordinated relation to provide a substantial increase in the mean camber height of each thereof relative to its subtending chord to control the pitching of the aircraft.

4. In combination in an aircraft, a wing having an adjustable leading edge flap and high lift means to increase the maximum lift coefficient of the wing to a value approaching the stall value, a control plane longitudinally spaced from said wing, means to adjust the effective angle of attack of said plane to control the aircraft in pitch, and common means connected to both said plane and said flap to adjust said nose flap to a position in major part below the lower wing contour to substantially increase the mean camber height of the wing above its subtending chord in coordination with the adjustment of the effective angle of attack of said plane to an increased effective angle of attack to assure the stalling of said plane before the stalling of said wing.

5. In an airplane, a main wing having a nose flap and a trailing edge flap, boundary layer control means on said upper wing surface including a surface slot in communication with the wing interior and a power driven blower for inducing a flow of fluid therethrough, a balancing plane positioned ahead of said main wing, means to displace said trailing edge flap downward, means to displace said nose flap downward substantially coincidentally with said downward displacement of said trailing edge flap to a position such that it extends in major part below the lower surface contour of the wing main body, and common means connected to both said plane and said flaps to adjust the effective angle of attack of said plane to an increased value in coordination with the displacement of said flaps to assure the stalling of said plane before the stalling of said main wing.

EDWARD A. STALKER.

REFERENCES CITED

The following references are of record in the file of this patent:

UNITED STATES PATENTS

| Number | Name | Date |
| --- | --- | --- |
| 1,800,746 | Page | Apr. 14, 1931 |
| 1,862,902 | McDonnell | June 14, 1932 |
| 1,895,458 | Hall | Jan. 31, 1933 |
| 2,003,206 | Lewis | May 28, 1935 |
| 2,024,853 | Gaines | Dec. 17, 1935 |
| 2,065,684 | Gaines | Dec. 29, 1936 |
| 2,104,006 | Ballou | Jan. 4, 1938 |
| 2,156,994 | Lachmann | May 2, 1939 |
| 2,271,226 | Johnson | Jan. 27, 1942 |
| 2,423,803 | Stalker | July 8, 1947 |
| 2,438,254 | Stalker | Mar. 23, 1948 |